United States Patent Office 3,434,523
Patented Mar. 25, 1969

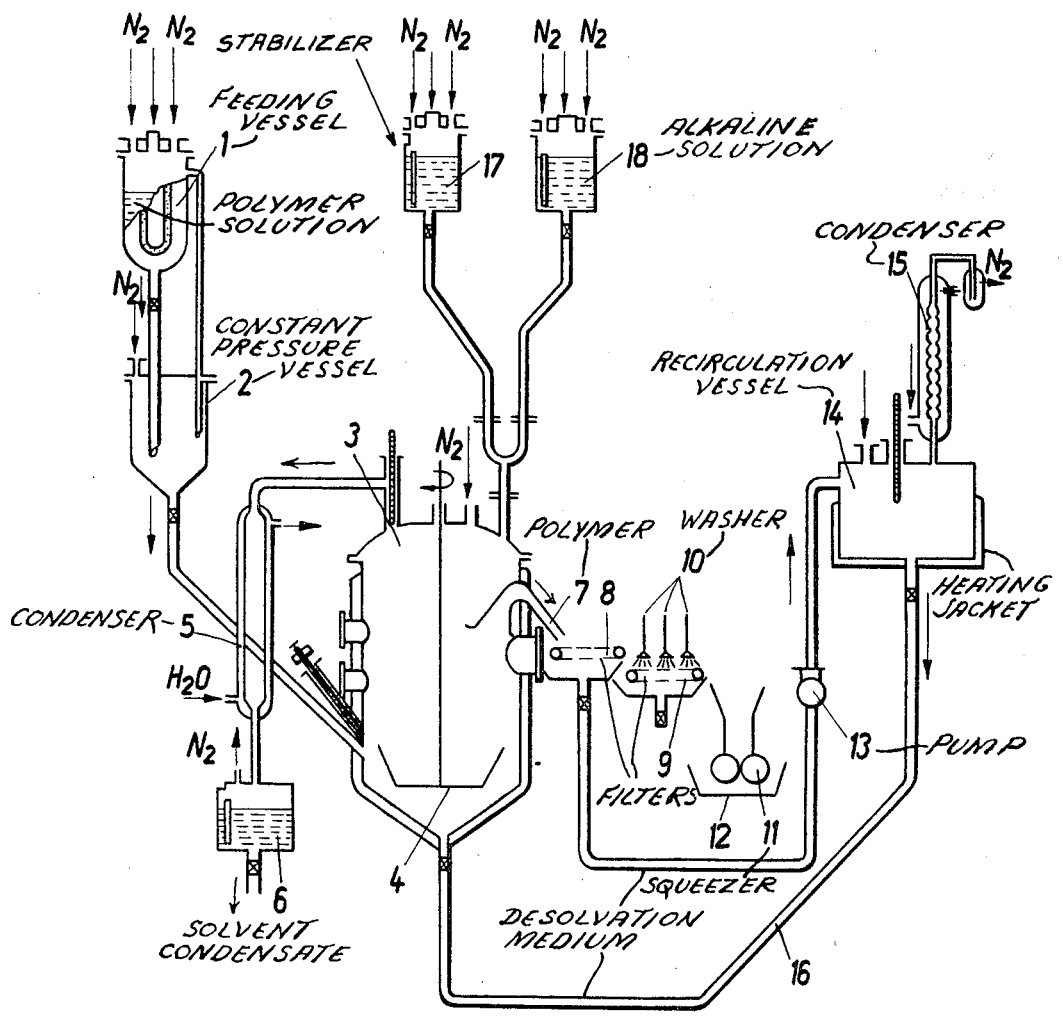

3,434,523
CONTINUOUS PROCESS AND PLANT FOR POLYMER SEPARATION FROM POLYMER SOLUTIONS
Elena Ceausescu and Victoria Fieroiu, Bucharest, Rumania, assignors to Ministerul Industriei Chimice, Bucharest, Rumania
Filed June 15, 1966, Ser. No. 557,665
Claims priority, application Rumania, June 16, 1965, 49,888
Int. Cl. B01d 43/00, 1/00
U.S. Cl. 159—47           2 Claims

ABSTRACT OF THE DISCLOSURE

A system for the continuous recovery of polymers from an organic-solvent solution thereof wherein the solution is introduced through a constant-pressure lock into a vessel containing water and a dispersion-stabilizing agent agitated at a high rate at a location in the region of the stirrer blades and the polymer is removed from the surface of the medium in this vessel, is filtered, washed and squeezed while the water medium is removed from the bottom of the solvating vessel and dispersion-stabilizing agent replenished.

---

The present invention relates to a continuous process and plant for polymer recovery from polymer solutions in the form of non-agglomerated particles having a low ash content without degradation of the polymers.

There is known a process for the recovery of polymers from polymer solutions which uses mechanical dispersion of the polymer solution in water to which a turbulent movement is applied, the temperature of the water being 50–100° C. The particles are maintained in turbulent motion until the solvent is distilled and then are cooled. The desolvation or solvent-removal operation is carried out in a vessel provided with a current breaker and a stirrer turning at a rate in excess of 1500 revolutions per minute. The polymer solution is fed into the beaker at the level of the stirrer. This process is disadvantageous because it is discontinuous and its productivity is low as a result of the fact that both desolvation and cooling of the solution are carried out in the same apparatus. In carrying out a continuous process, it is necessary for one to use several distillation vessels.

In another conventional process, separation of polymers in granular form from the polymer solution is carried out by introducing the solution to a vessel containing heated water in which a suspension-stabilizing agent of the cellulose-ester class or of the water-soluble-polymer class is distributed. The polymer solution is fed into the apparatus at the surface of the aqueous solution. After development of the suspension, the mixture is passed into a washing vessel which is provided with a stirrer and then is subjected to filtration. This process also has the low productivity because it is discontinuous.

The continuous separation of a polymer, for example cis-1,4-polybutadiene can be carried out according to still another earlier process by evaporating the solvent in two successive stages by using a concentrator provided along its length with two worm conveyers which are interpenetrating or axially overlapping in their middle portion and whose final worm pitch is reduced, followed then by an extruder dryer in the form of a worm conveyer with constant pitch, and an extrusion head. In the first phase, the heat necessary for evaporation of solvent is provided by the circulation of a heating fluid through both the walls of the concentrator and the interior of the worm conveyer, and in the second phase, when the concentration of the polymer in the solution is over 50%, the heating is provided by partial transformation into heat of the mechanical energy provided by the extrusion mechanism. This process has the disadvantage that the polymer is subjected to a mechanical degradation, with reduction of its molecular weight and poor physical-mechanical properties.

An object of this invention is to provide an improved process and apparatus for recovering a polymer from a solvent or other liquid vehicle.

The present invention eliminates the disadvantages of the known processes by introducing continuously the solution at a constant pressure into a desolvation vessel at the level of the stirrer, in such a manner that, because of the resulting fine dispersion, a rapid evaporation of solvent takes place and the desolvated polymer dispersion is continuously discharged from the apparatus by immediately separating the desolvating medium by filtration and by its recycling, the separated polymer being cooled and purified by removing the traces of solvent and dispersion agent by water washing followed by squeezing the polymer, all these operations being continuous.

The process is carried out in a plant consisting of a supply vessel for polymer solution provided with a glass liquid level gauge, a constant-pressure vessel provided with inert-gas supply and removal fittings for feeding vessels for adding a suspension stabilizer and the basic medium, a desolvating vessel provided with a heating jacket and stirrer, a reflux condenser, a collecting vessel for the distillates, a feeding vessel for an aqueous medium provided with a heating device as well as fitting for inert gas and a condenser, a pump for recirculating the aqueous medium, two filtration belts provided with spray heads, a squeezing roller and a collecting box for polymer foil.

Three examples of the application of the invention are presented below, reference being made to the accompanying drawing, the sole figure of which is a flow diagram illustrating the apparatus used for carrying out the present process.

Example 1

The polymer solution obtained from the polymerization of isoprene in n-heptane (organic solvent) with a catalyst of the type AlR$_3$+TiCl$_4$, after being submitted to a customary process deactivating the catalyst, stabilization and washing, is introduced into a supply vessel 1, with an inert-gas atmosphere. From the vessel 1, the polymer solution flows continuously through a valve into a constant-pressure vessel 2 from which, through a further valve, the solution is supplied to desolvation vessel 3, containing water and a conventional suspension stabilizer soluble in water. The water in the desolvation vessel is maintained at a temperature of about 98° C. and in turbulent motion by means of a stirrer 4 which rotates with a maximum speed of 500 revolutions per minute. The polymer solution is introduced into the desolvation vessel 3 at the level of the blade paddles of the stirrer 4 which promote a fine dispersal of the solution. The high temperature, above the boiling point of the organic solvent n-heptane, produces evaporation of the solvent, which is then condensed in a condenser 5 and collected in a vessel 6 provided with an atmosphere of inert gas. The desolvated polymer suspension is continuously evacuated through a lateral outlet spout 7 provided at the upper third of the desolvation vessel 3, falling down on a filtering conveyer belt 8 on which separation of the desolvation medium from the polymer is carried out. The polymer passes then on a second conveying belt 9 provided with spray heads 10, where cooling and purifying by water washing are carried out. From the conveying belt 9, the washed polymer falls onto a squeezing-roller assembly 11 and than in a collecting box or container 12.

The separated desolvating medium is displaced by means of a pump 13 to a recirculating vessel 14 provided with a heating jacket, for maintaining its temperature, and a reflux condenser 15; thereafter the desolvating medium is recycled to the desolvating vessel through a pipe line 16. The desolvating vessel 3 is also provided with a feeding vessel 17 containing a solution of suspension stabilizer which is added to replace the stabilizer lost when it is drawn off by the polymer suspension and a feeding vessel 18 containing alkaline solution for maintaining in a constant pH in vessel 3.

*Example II*

A polyisoprene solution in refined gasoline is desolvated as in Example I with the difference that the medium temperature is then maintained at 65 to 75° C.

*Example III*

A polybutadiene solution in benzene is desolvated as in Example I with the difference that the temperature of the aqueous medium is maintained at 75–80° C.

The invention presents the following advantages:

The characteristics of the recovered polymer are not influenced by changing conditions in the desolvating vessel because of the continuous evacuation of the product;

A fine-grained product is obtained which can be easily discharged from the apparatus and which is suitable for further treatment;

The solvent can be recovered in a proportion of 90%;

The above mentioned plant provides increased productivity, consists of available components, has small dimensions, and is not conditioned by the properties of the polymer solution (viscosity, solid-matter content).

We claim:

1. A process for the recovery of a polymer from an organic-solvent solution thereof, comprising the steps of:
   (a) introducing said organic-solvent solution of said polymer under constant pressure into a heated vessel, containing a stirred aqueous medium with a dissolved suspension-stabilizing agent, at a region close to the stirred region of said medium while maintaining said medium at a temperature in excess of the boiling point of the solvent of said solution, thereby forming a dispersion of polymer particles in said medium and driving said solvent therefrom in the form of a vapor;
   (b) continuously removing at the surface of said medium a stream of said particles in suspension in said medium by continuously supplying fresh medium to said vessel from below and causing said stream to overflow continuously;
   (c) filtering the stream of particles and medium overflowing in step (b) to separate the particles from said medium and thereafter returning the medium recovered by filtration in a continuous closed path for contact with additional quantities of said solution;
   (d) washing the polymer particles separated in step (c) from said medium and squeeze-drying the washed polymer particles;
   (e) maintaining the temperature in said vessel above the boiling point of said solvent by heating the medium separated from the particles in step (c) and returning it to said vessel for contact with additional quantities of said solution; and
   (f) condensing the vapors produced in said vessel to reconstitute said solvent.

2. A system for recovering a polymer from an organic-solvent solution thereof, comprising a pressure-retentive vessel having an overflow-discharge port at a relatively upper location thereof, a medium-inlet port at a relatively lower location thereof and a blade-type stirrer rotatable in said vessel with blades disposed between said inlet and discharge ports; supply means for continuously feeding said solution into said vessel under pressure at a level substantially corresponding to that of said blades; means for withdrawing vapors of the solvent of said solution from said vessel above said discharge port and for recondensing said vapors to reconstitute the solvent; filter means at said discharge port for separating polymer particles from an aqueous medium overflowing with the polymer particles therefrom; means for washing and drying the separated polymer particles; means for collecting the aqueous medium upon separation of polymer particles therefrom and recirculating the medium to said inlet port along a closed path and in a continuous stream; and heating means along said path for maintaining the temperature of said medium in said vessel above the boiling point of said solvent.

References Cited

UNITED STATES PATENTS

| 2,536,130 | 1/1951 | Green | 260—96 X |
| 2,611,751 | 9/1952 | Scott | 260—85.1 X |
| 2,615,010 | 10/1952 | Troyan | 260—96 X |
| 2,883,750 | 5/1958 | Vickers | 260—96 X |
| 2,915,489 | 12/1959 | White | 260—85.1 X |
| 3,056,772 | 10/1962 | Wallace | 260—94.9 |
| 3,072,626 | 1/1963 | Cines | 260—96 |
| 3,324,011 | 6/1967 | Baum et al. | 203—6 |
| 3,341,623 | 9/1967 | Hahn | 260—94.7 X |

NORMAN YUDKOFF, *Primary Examiner.*

J. SOFER, *Assistant Examiner.*

U.S. Cl. X.R.

159—25; 203—47; 260—96